United States Patent
Hwang (10) Patent No.: US 9,621,477 B2
(45) Date of Patent: Apr. 11, 2017

(54) SYSTEM AND METHOD OF OFFLOADING BROWSER COMPUTATIONS

(71) Applicant: SAMSUNG ELECTRONICS CO., LTD., Suwon-si (KR)

(72) Inventor: In-chul Hwang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 145 days.

(21) Appl. No.: 14/178,993

(22) Filed: Feb. 12, 2014

(65) Prior Publication Data

US 2014/0237120 A1  Aug. 21, 2014

(30) Foreign Application Priority Data

Feb. 15, 2013 (KR) .................. 10-2013-0016563
Jan. 14, 2014 (KR) .................. 10-2014-0004301

(51) Int. Cl.
| | | |
|---|---|---|
| G06F 15/16 | (2006.01) | |
| H04L 12/911 | (2013.01) | |
| G06F 9/48 | (2006.01) | |
| G06F 9/50 | (2006.01) | |
| H04L 29/08 | (2006.01) | |

(52) U.S. Cl.
CPC ............ *H04L 47/70* (2013.01); *G06F 9/4862* (2013.01); *G06F 9/5044* (2013.01); *H04L 67/02* (2013.01); *H04L 67/10* (2013.01); *G06F 9/505* (2013.01); *G06F 2209/509* (2013.01)

(58) Field of Classification Search
CPC . H04L 67/10–67/1097; G06F 9/4806–9/4887; G06F 9/50–9/5055; G06F 2209/509
See application file for complete search history.

(56) References Cited

U.S. PATENT DOCUMENTS

| | | | |
|---|---|---|---|
| 2002/0184373 A1* | 12/2002 | Maes | G10L 15/30 709/228 |
| 2003/0097418 A1* | 5/2003 | Yajima | H04L 67/1095 709/216 |
| 2003/0101213 A1* | 5/2003 | Wright | H04L 29/06 709/203 |

(Continued)

OTHER PUBLICATIONS

Zhang, Xinwen, et al. "Elastic HTML5: workload offloading using cloud-based web workers and storages for mobile devices." Mobile Computing, Applications, and Services. Springer Berlin Heidelberg, 2012. 373-381.*

(Continued)

*Primary Examiner* — David Lazaro
*Assistant Examiner* — Julian Chang
(74) *Attorney, Agent, or Firm* — Sughrue Mion, PLLC (57) ABSTRACT

A method of operating a browser of a terminal apparatus is provided. The method of operating a browser of a terminal apparatus according to various exemplary embodiments includes: confirming a resource needed for a first computation for operating the browser in the terminal apparatus; requesting an external device perform the first computation when the resource does not exist or is insufficient; receiving from the external device data according to a result of the first computation; and displaying data on the browser using the received data.

19 Claims, 9 Drawing Sheets

(56) References Cited

U.S. PATENT DOCUMENTS

| | | | |
|---|---|---|---|
| 2004/0080504 A1* | 4/2004 | Salesky | G06F 3/1415 345/418 |
| 2005/0027823 A1* | 2/2005 | Rana | G06F 17/30905 709/219 |
| 2006/0165074 A1* | 7/2006 | Modi | H04L 29/12367 370/389 |
| 2007/0006289 A1* | 1/2007 | Limont | H04W 8/22 726/6 |
| 2007/0237077 A1* | 10/2007 | Patwardhan | H04L 47/10 370/230 |
| 2008/0069458 A1* | 3/2008 | Vega-Higuera | G06T 15/08 382/232 |
| 2008/0077690 A1* | 3/2008 | Miyajima | G06F 9/5088 709/226 |
| 2008/0268828 A1* | 10/2008 | Nagaraja | G06F 9/505 455/419 |
| 2010/0088414 A1* | 4/2010 | Lin | H04L 63/102 709/227 |
| 2010/0131592 A1 | 5/2010 | Zhang et al. | |
| 2010/0272258 A1* | 10/2010 | Sadovsky | G06F 9/5027 380/255 |
| 2010/0325279 A1* | 12/2010 | Heim | G06F 9/5077 709/226 |
| 2011/0246596 A1* | 10/2011 | Cao | G06F 9/4843 709/208 |
| 2011/0263332 A1* | 10/2011 | Mizrachi | A63F 13/12 463/42 |
| 2011/0289308 A1* | 11/2011 | Sobko | G06F 21/56 713/100 |
| 2011/0320520 A1* | 12/2011 | Jain | G06F 9/5072 709/203 |
| 2012/0089381 A1* | 4/2012 | Chu | G01W 1/00 703/6 |
| 2012/0102098 A1* | 4/2012 | Guillou | G06F 9/5083 709/203 |
| 2012/0154412 A1* | 6/2012 | Harney | G06T 1/20 345/522 |
| 2012/0169836 A1* | 7/2012 | Setlur | H04L 12/1827 348/14.11 |
| 2012/0192191 A1* | 7/2012 | Jellinek | G06F 9/5044 718/102 |
| 2012/0215834 A1* | 8/2012 | Chen | G06F 17/30905 709/203 |
| 2012/0322387 A1* | 12/2012 | Nicoara | H04M 1/24 455/67.11 |
| 2013/0198612 A1* | 8/2013 | Ceze | G06F 17/30899 715/235 |
| 2014/0208327 A1* | 7/2014 | Cadambi | G06F 9/5044 718/103 |
| 2014/0237120 A1* | 8/2014 | Hwang | G06F 9/5044 709/226 |
| 2014/0237477 A1* | 8/2014 | Cadambi | G06F 9/5044 718/103 |
| 2015/0150086 A1* | 5/2015 | Clark | G06F 19/322 726/3 |
| 2015/0229739 A1* | 8/2015 | Chen | H04L 67/42 709/203 |

OTHER PUBLICATIONS

Li, Winson YS, et al. "JSCloud: toward remote execution of JavaScript code on handheld devices." Proceedings of the 12th International Conference on Quality Software (QSIC 2012), Xi'an, Shaanxi, China, Aug. 27-29, 2012. IEEE Computer Society., 2012.*
Zhang, Yang, et al. "A heterogeneous auto-offloading framework based on web browser for resource-constrained devices." Internet and Web Applications and Services, 2009. ICIW'09. Fourth International Conference on. IEEE, 2009.*
Wang, Xudong, et al. "Migration and execution of JavaScript applications between mobile devices and cloud." Proceedings of the 3rd annual conference on Systems, programming, and applications: software for humanity. ACM, 2012.*
Jiao, Lei, et al. "Cloud-based computation offloading for mobile devices: State of the art, challenges and opportunities." Future Network and Mobile Summit (FutureNetworkSummit), 2013. IEEE, 2013.*
Welc, Adam, et al. "Generic workers: Towards unified distributed and parallel JavaScript programming model." Programming Support Innovations for Emerging Distributed Applications. ACM, 2010.*
Wang, Haoyu, et al. "Mobile web browser optimizations in the cloud era: A survey." Service Oriented System Engineering (SOSE), 2013 IEEE 7th International Symposium on. IEEE, 2013.*
Kurumatani, Shunsuke, Masashi Toyama, and Eric Y. Chen. "Executing Client-Side Web Workers in the Cloud." Information and Telecommunication Technologies (APSITT), 2012 9th Asia-Pacific Symposium on. IEEE, 2012.*
Zbierski, Maciej, and Przemyslaw Makosiej. "Bring the Cloud to Your Mobile: Transparent Offloading of HTML5 Web Workers." Cloud Computing Technology and Science (CloudCom), 2014 IEEE 6th International Conference on. IEEE, 2014.*
Hwang, Inchul, and Jonggyu Ham. "WWF: web application workload balancing framework." Advanced Information Networking and Applications Workshops (WAINA), 2014 28th International Conference on. IEEE, 2014.*
Hwang, Inchul. "Design and implementation of cloud offloading framework among devices for web applications." Consumer Communications and Networking Conference (CCNC), 2015 12th Annual IEEE. IEEE, 2015.*
Hwang, Inchul. "Adaptive Computational Workload Offloading Method for Web Applications." Computational Science and Its Applications—ICCSA 2015. Springer International Publishing, 2015. 459-471.*
Zhang, Xinwen, et al. "Towards an elastic application model for augmenting the computing capabilities of mobile devices with cloud computing." Mobile Networks and Applications 16.3 (2011): 270-284.*
Communication dated May 15, 2014, issued by the European Patent Office in counterpart European Application No. 14153107.9.
Communication dated Aug. 25, 2015 issued by the European Patent Office in counterpart European Patent Application No. 14 153 107.9.
Communication dated Mar. 11, 2016, issued by the European Patent Office in counterpart European Application No. 14153107.9.
Communication dated Nov. 14, 2016, issued by the European Patent Office in counterpart European Application No. 14153107.9.
Rajeev R. Raje et al., "Asynchronous Remote Method Invocation (ARMI) mechanism for Java", Concurrency: Practice and Experience, John Wiley & Sons, Ltd., vol. 9, No. 11, (Nov. 1997), pp. 1207-1211, XP-000879373.

* cited by examiner

SYSTEM AND METHOD OF OFFLOADING BROWSER COMPUTATIONS

CROSS-REFERENCE TO RELATED APPLICATIONS

This application claims priority under 35 U.S.C. §119(a) from Korean Patent Application No. 10-2013-0016563, filed on Feb. 15, 2013, and Korean Patent Application No. 10-2014-0004301, filed on Jan. 14, 2014, in the Korean Intellectual Property Office, the contents of which are incorporated herein by reference, in its entirety.

BACKGROUND

1. Field

The exemplary embodiments relate to an operation of a browser in a terminal apparatus. More particularly, the exemplary embodiments relate to a terminal apparatus in which an external device conducts computation for operating a browser in a terminal apparatus, a server, a system of operating a browser of a terminal apparatus and a method of operating a browser of a terminal apparatus.

2. Description of the Related Art

A browser refers to an application program for searching information in a network, including the Internet. An application program may be installed as a part of an operating system or may be implemented as a separate application. It may also be called a web browser or Internet browser.

A browser collects data on the Web, processes the data according to a predetermined format and displays the data in graphics or transfers the sound. For example, a browser provides text information, video, music streaming and a login function of a particular server. Technically, a web browser analyzes and renders resources such as HTML/CSS/Javascript/Image.

As an example, Javascript is widely used as a script web language capable of dynamic interaction with a user without a COM file. Javascript is transferred via the Web to a user terminal and used for interaction with a user. At this time, the Javascript is executed at a user's terminal.

When Javascript is executed at a user's terminal, the work processing capability of a browser depends on the resource and performance of the user's terminal. For example, when a video is played on a browser, a video play function is used which is supported by the operating system of the system, to which the browser is installed. Accordingly, in the case where the video provided via the Web is encoded according to a certain scheme, in response to the operating system not supporting Codec for decoding the video, the result is that the browser cannot play the video.

In addition, in response to the overhead of work to be processed by a browser being large and the performance of a device to which the browser is installed not being sufficient, the browser processing rate is lowered. For example, you may think the case where a chess game provided via a browser from an external server is enjoyed. In the case where a user plays an chess game with a virtual user (computer) set in the game, in response to the computation for the number of chess-pieces put by a user being conducted at a device to which the browser is installed, more complicated number of computations are required as the level of the game becomes higher. A browser will compute the number of scenarios using the resource of the device, the performance of the browser for game may be decreased due to the limited performance of the system. In particular, in the case of a mobile apparatus, the system resource is more limited, and thus the browser suffers performance stress.

A browser to which a Web program engine is installed mainly supports a single threaded environment. In other words, the browser executes a Web program at once during sequential parsing process. A single threaded scheme conducts a call for performing a separate computation in the middle of the Web program and in response to a return value not being obtained, it is impossible to execute the next line of the Web program until the return value is obtained. Accordingly, in response to a script that requires a lot of time to obtain a return value being executed, it is inevitable that the execution time of the program will be delayed.

Therefore, a demand exists for a method that can smoothly perform work having relatively large overhead in a browser that is installed to a multithread supporting device with limited resources.

SUMMARY

The exemplary embodiments provide a terminal apparatus that can smoothly perform work having a relatively large overhead in a browser attached to a device with limited resources, a server, a system of operating a browser of a terminal apparatus, and a method of operating a browser of a terminal apparatus.

According to an aspect of an exemplary embodiment, there is provided a method of operating a browser of a terminal apparatus, the method including: confirming a resource needed for a first computation for operating the browser in the terminal apparatus; requesting an external device for the first computation when the resource does not exist or the resource exists but is insufficient; receiving data from the external device according to a result of the first computation; and displaying data on the browser using the received data.

The displaying data may include rendering an image on the browser using the received data.

The confirming a resource may include determining whether a computation can be conducted within a predetermined time based on at least one of a memory in the terminal apparatus, an operating process and a processing rate.

The method may further include selecting an external device to conduct the first computation and form a channel when the resource does not exist or is insufficient.

The forming a channel may include selecting the external device to conduct the first computation in view of a network state in which the terminal apparatus is connected with the external device.

The external device may be a server or another terminal apparatus.

The first computation may be a web worker threaded process work.

The method may further include: conducting a second computation for operating the browser within the terminal apparatus independently of the first computation.

According to an aspect of an exemplary embodiment, there is provided a computation method of operating a browser of a terminal apparatus, the method comprising: receiving a request for computation for operating a browser from the terminal apparatus when a resource of the terminal apparatus is insufficient or does not exist; conducting the computation according to the received computation request; and transmitting data relating to the external device a result of the conducted computation.

According to an aspect of an exemplary embodiment, a method of operating a browser of a terminal apparatus is provided, the method, comprising: confirming, by the terminal apparatus, a resource needed for computation to operate the browser in the terminal apparatus; requesting, by the terminal apparatus, an external device for the computation when the resource does not exist or is insufficient; conducting, by the external device, the computation; transmitting, to the terminal apparatus through the external device, data according to a result of the computation; and displaying, on the browser, through the terminal apparatus, data using the received data.

According to an aspect of an exemplary embodiment, there is provided a terminal apparatus comprising: a display configured to display a browser; a communicator configured to communicate with an external device; and a controller configured, when a resource needed for computation for operating a browser in a terminal apparatus is insufficient or does not exist, to request the external device for the computation and to receive data according to a result of the computation, and configured to control to display data on the browser using the received data.

The controller may be configured to render an image on the browser using the received data.

The controller may be configured to determine whether the resource is insufficient or does not exist by determining whether a computation can be conducted within a predetermined period of time based on at least one of a memory in the terminal apparatus, an operating process and a processing rate.

The controller may be configured to select an external device to conduct the computation and to form a channel when the resource is insufficient or does not exist.

The controller may be configured to select an external device to conduct the computation in view of a network state in which the terminal apparatus is connected with the external device.

The external device may be a server or may be another terminal apparatus.

The computation may be a web worker threaded process.

The terminal apparatus may be a mobile apparatus.

According to an aspect of an exemplary embodiment, there is provided a server comprising: a communicator configured to communicate with a terminal apparatus; and a controller configured, when a resource in a terminal apparatus is insufficient or does not exist, to receive a request for computation for operating a browser from the terminal apparatus and configured to conduct the computation according to the received request for computation and configured to transmit to the external device data related to a result of the conducted computation.

According to an aspect of an exemplary embodiment, there is provided a system of operating a browser of a terminal apparatus, the system comprising: a first apparatus configured, when a resource needed for computation for operating a browser in a terminal apparatus is insufficient or does not exist, to request a second apparatus for the computation and to display data on the browser using a result of the computation received from the second apparatus; and a second apparatus configured, when there is a request from the first apparatus, to conduct the computation and transmit to the first apparatus data according to a result of the computation.

An aspect of the exemplary embodiments may provide a terminal apparatus including: a communicator configured to communicate with an external device; and a controller configured to request the external device perform a computation and receive data according to a result of the computation and configured to display data using the received data, in response to a resource needed for computation for operating a browser in a terminal apparatus being insufficient or does not exist.

The terminal apparatus may further include a display, and the controller may be configured to display data on the browser. In addition, the controller may be configured to render an image using the received data.

The controller may determines whether the resource is insufficient or does not exist by determining whether a computation can be conducted within a predetermined period of time based on at least one of a memory in the terminal apparatus, an operating process and a processing rate.

According to the various exemplary embodiments, one skilled in the art can smoothly perform work having relatively large overhead in a browser that is installed to a device with limited resources.

Additional aspects and utilities of the exemplary embodiments will be set forth in part in the description which follows and, in part, will be obvious from the description, or may be learned by practice of the exemplary embodiments.

BRIEF DESCRIPTION OF THE DRAWINGS

These and/or other aspects and utilities of the exemplary embodiments will become apparent and more readily appreciated from the following description, taken in conjunction with the accompanying drawings of which.

DETAILED DESCRIPTION OF THE EXEMPLARY EMBODIMENTS

Reference will now be made in detail to the exemplary embodiments, examples of which are illustrated in the accompanying drawings, wherein like reference numerals refer to the like elements throughout. The exemplary embodiments are described below in order to explain the present disclosure by referring to the figures.

Figure 1:
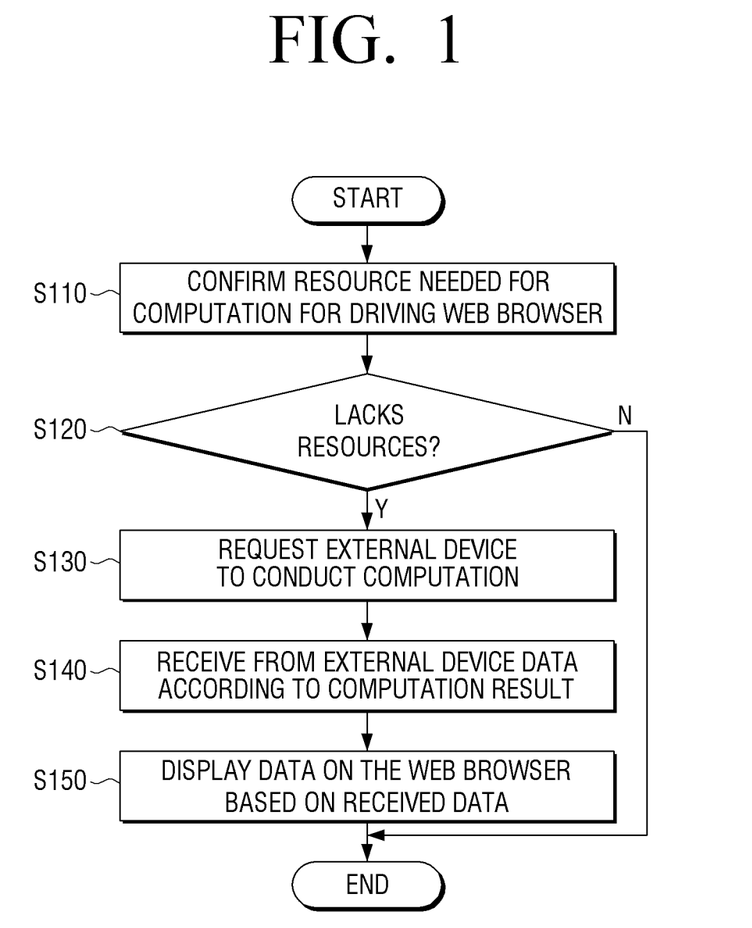
FIG. 1 is a flowchart of a method of operating a browser of a terminal apparatus, according to an exemplary embodiment.

FIG. 1 is a flowchart of a method of operating a browser of a terminal apparatus according to an exemplary embodiment.

Referring to FIG. 1, a method of operating a browser of a terminal apparatus according to an exemplary embodiment comprises: steps of confirming a resource for operating a browser (S110); determining whether the resource is insufficient (S120); requesting an external device for the computation (S130); receiving computation data from the external device (140); and displaying the received data on the browser (S150).

The terminal apparatus is a mobile or stationary device which provides functions capable of searching, surfing and displaying information provided from Web pages through a browser installed in a device. For example, the terminal apparatus may be one of smart phones, tablet PCs, computers, digital televisions, E-book devices, PMPs and MP3 players.

An operating system at the initial stage of operating a browser of a terminal apparatus loads a browser process on a memory in order to enter an execution state. Loading the browser process prepares the browser for interaction with a user.

When a user inputs a certain Web service request, such as inputting a certain Web site address, the browser analyzes the user's request. In detail, the browser analyzes the user's request and obtains the type of Web service and physical address. The operating system transmits the service request to an external device such as a server.

Upon receipt of a service request, the external device confirms the address of a terminal apparatus requesting the service and the type of service. The external device provides service data, including text information written in Web program language, to a terminal apparatus.

The terminal apparatus receives service data and parses for the received service data. While parsing, the terminal apparatus uses a resource of the terminal apparatus, if necessary. Referring back to the aforementioned chess game, the terminal apparatus receives chess program, and the browser analyzes and executes the received chess program. To execute the chess program, a memory, cache, CPU, a sound card and a graphic card, which are resources of the terminal apparatus, are used. The operating system of the terminal allocates a process to the browser.

In S110, the terminal apparatus determines whether there exists a resource needed for operating a browser. Information related to the resource needed for executing a program may be included within service data. The browser may determine what resource is needed for executing the program is. The browser asks the operating system whether there exists a resource needed for operating the program, and the operating system informs the browser whether the resource exists.

For example, when a video is played on the browser, the terminal apparatus determines whether the operating system, to which the browser is installed, supports playing a video. When a video provided through the Web is encoded in a certain manner, the terminal apparatus determines whether the operating system of the terminal apparatus, to which the browser is installed, supports the Codec necessary for decoding the video. If the browser does not support the Codec, it is impossible for the browser to play the video, and thus the browser may request an external device such as a server for the Codec.

In addition, the terminal apparatus determines whether there is a sufficient storage space that can store streaming data for playing a video. When there is in sufficient storage space, the terminal apparatus should delete existing data or may stop playing the video.

Referring back to case in which a user plays the chess game with a virtual user (computer) set in a game, the number of scenarios of chess pieces that can be put forth by the virtual user should be computed right after a user moves a chess piece, and the computation should be terminated within a predetermined time. When a user agonizes over the position of the next move of a chess piece, a computer may, in advance, compute the position of the chess piece. At this time, a plurality of numbers of computation processes should be secured. In particular, as the level of games becomes higher, more complicated computations of the number of cases are required. The browser confirms a resource of the terminal apparatus needed for computation. If the terminal apparatus is a mobile apparatus, the resource is more limited.

The browser may determine the resource at the initial stage of conducting the program, but when the data amount of the program is larger, the browser may determine the resource in real time during the process of conducting the program or with respect to a predetermined portion of the program.

If the browser supports HTML 5, the Web program may include Web Worker source. In general, the Web program is conducted in a single threaded mode. In other words, the Web program is executed at once through a sequential parsing process. A single threaded scheme conducts a call for performing a separate computation in the middle of the Web program and if a return value being obtained, it is impossible to execute the next line of the Web program until the return value is obtained. Accordingly, in response to a script that requires a large amount of time for obtaining a return value being executed, to delay of the execution time of the program is inevitable. HTML 5 includes the specification for Web worker so that a multi threaded scheme is executed.

Since the Web worker provides a standard method to allow Javascript code to be executed in a separate background from a UI thread, web worker may play the script without blocking the Web page. The Web worker is proper for works that should be continuously conducted without interruption by very complicated mathematical computation work, access work to other resources and a UI thread in the background. To transmit data in Web worker, a method of postMessage is used, and to receive data, an on message event is used.

The part written by Web worker may require a great deal of computation, and thus the browser may determine, based on the Web worker part, whether the required resource exists in the terminal apparatus. Or, the browser may assume that the resource for operating the Web worker does not exist in the terminal apparatus, based only on there being a Web worker part.

The browser may determine the resource at the initial stage of conducting the program, but when the data amount of the program is big, the browser may determine the resource in real time during the process of conducting the program or with respect to predetermined part of the program.

In S120, upon determination that the resource is insufficient, the terminal apparatus requests an external apparatus for computation (S130).

As in the aforementioned exemplary embodiment, in the case where a program includes a Web worker object, in response to the resource for processing the Web worker object being insufficient, the terminal apparatus requests an external device for computation of the Web worker object. Or, the terminal apparatus may request an external device for computation unconditionally, with regard to the Web worker object. In response to a determination that the resource for other programs as well as the Web worker object is insufficient, it may be possible to request an external device for computation.

In the embodiment of playing chess game with a computer, in response to a user moving a chess piece, the resource of the computer for computing the next move may be insufficient. The browser may transmit the user's move and current game information to the external device and the external device computes the next move of the computer. The external device provides information related to the computation result to the terminal apparatus, within a predetermined period of time.

In response to the function of computing the move of the computer being written with the Web worker object, the browser may conduct computation of the object through the Web worker. However, in response to the resource of the terminal apparatus being insufficient, the Web worker object is transmitted to the external device. In detail, the object is transmitted to the external device through the postMessage method. The external device conducts computation and then the terminal apparatus receives the computation result data of the external device through an onmessage event.

The external device conducts computation according to a request. The external device should have means for conducting the computation. The external device requires an engine for analyzing and processing the Web worker object in the case that a Web worker object is received. In addition, the external device should have sufficient resources for conducting the computation.

The browser of the terminal apparatus receives data from the external device (S140) according to the computation result.

In S150, data is displayed on the browser using the received data. S150 may be the work of rendering an image on the browser using the received data.

In the embodiment of playing the chess game with a computer, the browser displays a newly changed chess board according to the chess piece arrangement of the computer using the data of the computation result received from the external device.

In response to the function of computing the move of the computer being written in the Web worker object, the browser configures the browser screen using the data of the computation result received from the external device.

Hereinafter, a changed exemplary embodiment will be explained.

Figure 2:
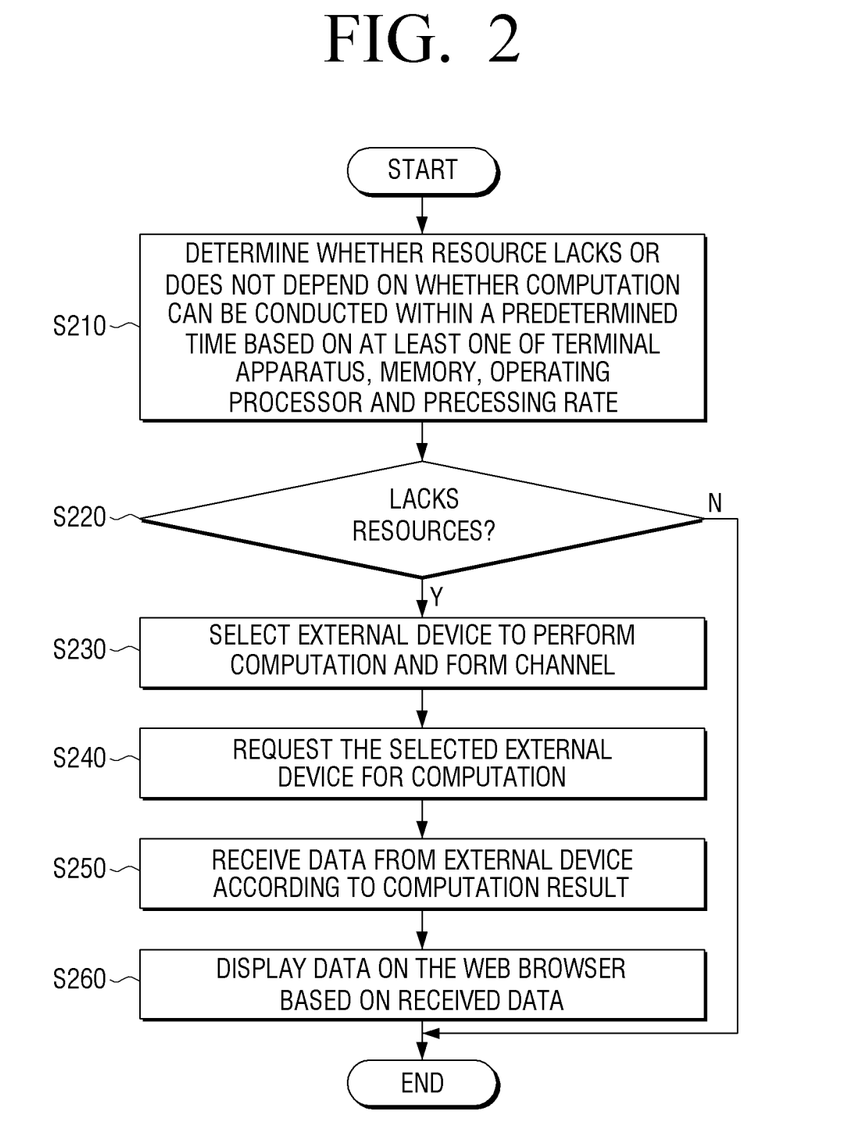
FIG. 2 is a flowchart of a method of operating a browser of a terminal apparatus, according to another exemplary embodiment.

FIG. 2 is a flowchart of a method of operating a browser of a terminal apparatus, according to another exemplary embodiment.

Referring to FIG. 2, a method of operating a browser of a terminal apparatus according to another exemplary embodiment comprises: the steps of determining whether a resource is insufficient (S210); when the resource is insufficient (S220-Y), selecting an external device and forming a channel (S230); requesting the external device for performing the computation (S240); receiving the computation result from the external device (S250); and displaying data on the browser using the received data (S260).

S210, S220, S240, S250 and S260 correspond to aforementioned S110, S120, D130, S140 and S150, respectively, and thus the repeated explanation herein will be omitted.

In S230, when the resource is insufficient or does not exist, an external device is selected to conduct the computation and a channel is formed.

Accordingly, the external device is required to have more plentiful resources than the terminal apparatus. For example, the external device may need to have a high performance CPU, a high-capacity storage medium and sufficient space for the work pool, compared to the terminal apparatus.

According to the above criteria, a device for conducting computation may be selected from a plurality of external devices.

In various exemplary embodiments including the aforementioned exemplary embodiment, the external device may be one of a server and another external terminal apparatus. For example, in the case where the terminal apparatus is a smart phone, in response to a TV being near to the smart phone, the external device may be the TV when the resource of the TV is sufficient. However, in response to a PC is near to the smart phone, the resource of the PC is more sufficient, and thus the external device is selected as the PC. In addition, in response to it being possible to communication with a high performance server, the external device may be the server.

When an external device is selected and a channel is formed, various technologies may be used for executing a communication channel. The communication channel may be the Internet which can be accessed through a common IP address, or may be a local area wireless communication which uses radio frequency. In addition, a communication channel may be formed via a small-scale home wired network.

An external device should receive a computation request, rapidly perform computation and then transmit the computation result data to a terminal apparatus. Thus, an external device for performing the computation may be selected by considering the network state which connects the terminal apparatus with the external device.

For example, a terminal apparatus may perform communication with a server by connecting based on Wifi, which is a kind of local area wireless communication, to AP via the Internet. Concurrently, the terminal apparatus may directly communicate with an adjacent computer via Wifi direct. However, in response to there being a problem in the communication quality of Wifi direct, although the physical distance is nearer, a communication with a server may be faster. In this case, a server connected through the Internet based on Wifi, not Wifi direct, may be selected as an external device.

The method of operating a browser of a terminal apparatus according to various exemplary embodiments may further comprise the step of conducting another computation, independently from the above computation, for operating the browser in the terminal apparatus.

In particular, the browser of the terminal apparatus may provide a multi-threaded environment. Accordingly, in response to the browser of the terminal apparatus requesting an external device for a first computation during the process of executing the program received from the external device, the browser may conduct a second computation different from the first computation before the result of the first computation is received. Thus, a delay taken until a return value is obtained after a call for performing a separate computation in the middle of the Web program in a single threaded scheme is conducted may be removed, so the program can more rapidly be executed.

In the exemplary embodiment of playing the chess game with a computer, when a user makes a chess move, in response to there being a request for a first computation for computing the computer's next move, a server starts the first computation. The browser may provide a strategy for the next chess piece to be moved to a user while the server conducts the first computation. The strategy may be information related to the positions of the chess pieces with a high winning rate based on data statistically analyzing the data of the previous games. At this time, a second computation may be required to statistically analyze data of the previous game for providing the strategy. The browser may perform the second computation independently from the first computation.

Of course, the object of the program for conducting the second computation may be the Web worker object. The Web worker object may be executed in a terminal apparatus, the external device, or in another external device.

Hereinafter, a method of performing, by an external device, a computation for operating a browser of a terminal apparatus according to various exemplary embodiments will be explained.

Figure 3:
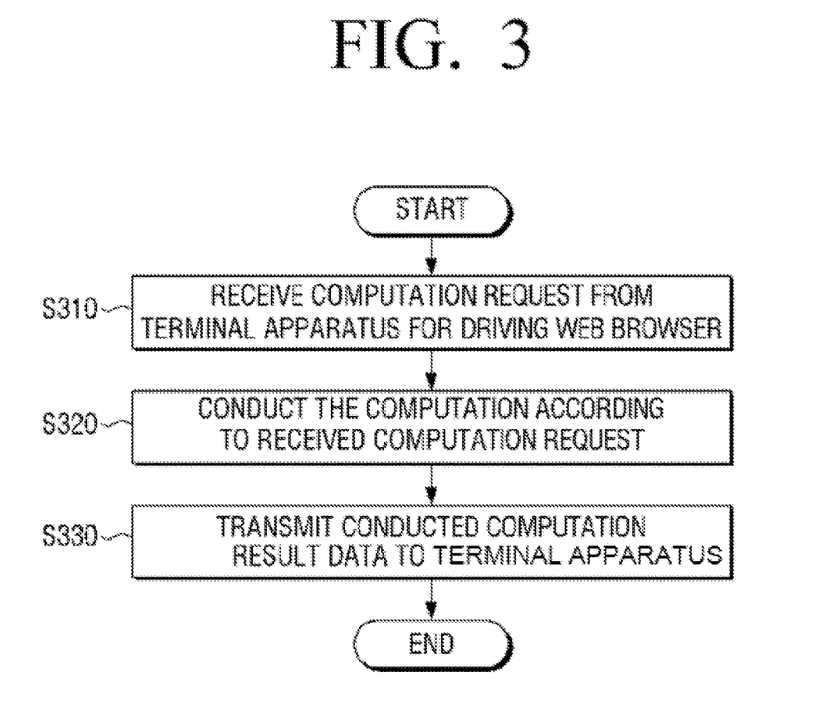
FIG. 3 is a flowchart of a method of computation for operating a browser of a terminal apparatus, according to various exemplary embodiments.

FIG. 3 is a flowchart of a method of computation for operating a browser of a terminal apparatus, according to various exemplary embodiments.

Referring to FIG. 3, the method of computation for operating a browser of a terminal apparatus according to various exemplary embodiments comprises the steps of: receiving a computation request from a terminal apparatus (S310); conducting the computation (S320); and transmitting the computation result data to the terminal apparatus (S330).

The aforementioned steps explain the operation of the external device. Namely, when there is a computation request from the terminal apparatus, the external device receives the program part for computation and conducts computation. Then, the external device transmits the computation result data to the terminal apparatus.

The detailed operations of the external device and the terminal apparatus in each step are the same as in the aforementioned exemplary embodiments, and thus repeated explanations will be omitted.

Hereinafter, a method of operating a browser of a terminal apparatus based on interaction between a terminal apparatus and an external device according to various exemplary embodiments will be explained.

Figure 4:
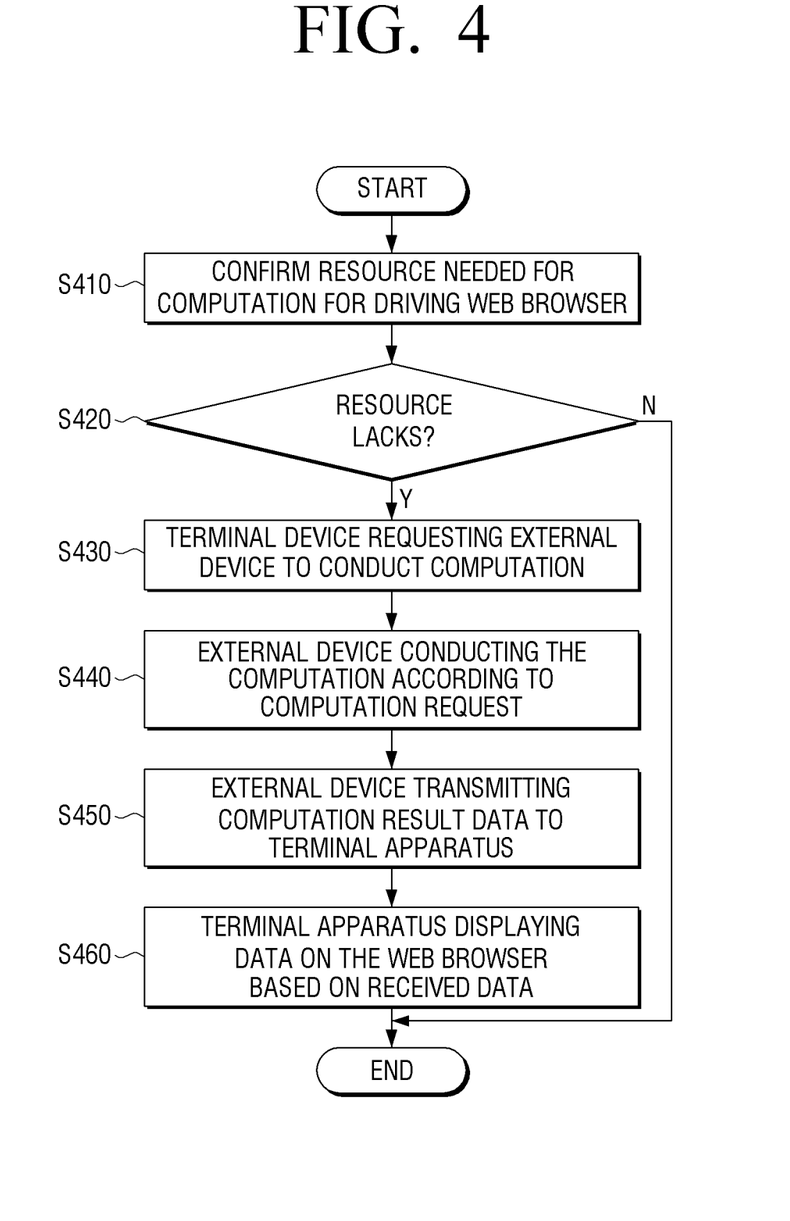
FIG. 4 is a flowchart of a method of operating a browser of a terminal apparatus, according to various exemplary embodiments.

FIG. 4 is a flowchart of a method of operating a browser of a terminal apparatus according to various exemplary embodiments.

Referring to FIG. 4, the method of operating a browser of a terminal apparatus according to various exemplary embodiments comprises the steps of confirming, by the terminal apparatus, a resource needed for computation (S410); when the resource is insufficient (S420-Y), requesting, by the terminal apparatus, an external device to perform the computation (S420); conducting, by the external device, the computation according to the request for computation (S430); transmitting, by the external device, the computation result data to the terminal apparatus (S450); and displaying, by the terminal apparatus, data on the browser using the received data (S460).

The above steps are the same as explained in the aforementioned exemplary embodiments.

Hereinafter, a system of operating a browser of a terminal apparatus, a terminal apparatus and an external device according to various exemplary embodiments will be explained.

Figure 5:
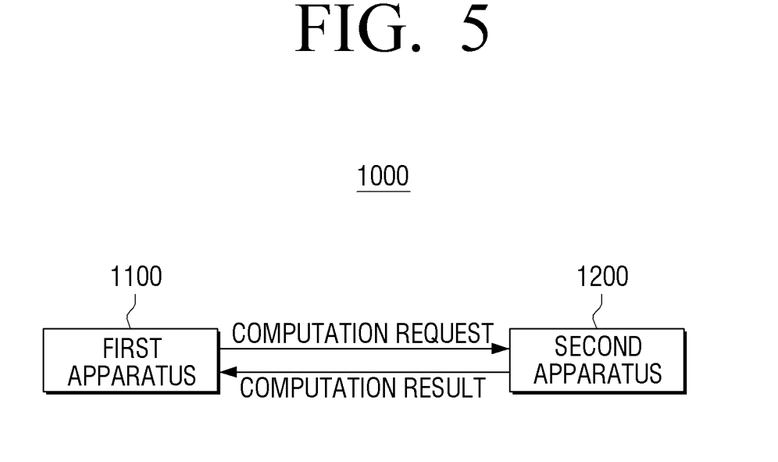
FIG. 5 is a block diagram of a system of operating a browser of a terminal apparatus, according to various exemplary embodiments.

FIG. 5 is a block diagram of a system of operating a browser of a terminal apparatus, according to various exemplary embodiments.

Referring to FIG. 5, a system 1000 of operating a browser of a terminal apparatus according to various exemplary embodiments comprises a first apparatus 1100 which requests a computation for operating a browser of a terminal apparatus and a second apparatus 1200 which conducts and transmits computation, according to the request.

When the resource needed for computation for operating a browser is insufficient or does not exist, the first apparatus 1100 requests the second apparatus 1200 perform the computation and displays the data on the browser using the computation result received from the second apparatus 1200. The first apparatus 1100 is the same as the aforementioned terminal apparatus.

When there is a request from the first apparatus 1100, the second apparatus 1200 conducts the computation and transmits data to the first apparatus 1100 according to the computation result. The second apparatus 1200 is the same as the aforementioned external device.

Figure 6:
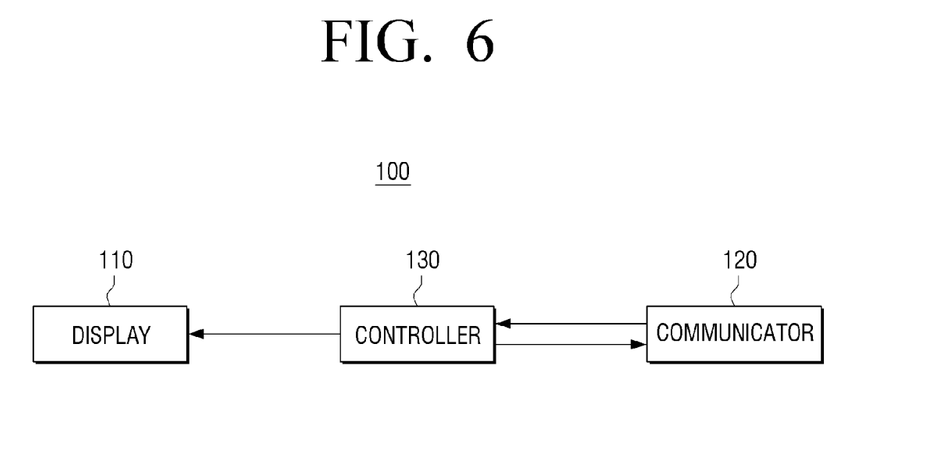
FIG. 6 is a block diagram of a terminal apparatus, according to an exemplary embodiment.

FIG. 6 is a block diagram of a terminal apparatus 100, according to an exemplary embodiment.

Referring to FIG. 6, a terminal apparatus 100 according to an exemplary embodiment comprises a display 110, a communicator 120 and a controller 130. The terminal apparatus 100 may be implemented by the aforementioned first apparatus 1100.

The display 110 displays a browser. When information regarding the browser is changed, the display 110 displays the browser with the changed information. The display 110 may be implemented as various display technologies such as a liquid crystal display panel, a plasma display panel, an organic light emitting diodes (OLED), a vacuum fluorescent display (VFD), a field emission display (FED) and an electro luminescence display (ELD). Other possible configurations of the display 110 are not part of the technical characteristics of the exemplary embodiments, and thus, they will be omitted.

The communicator 120 communicates with an external device. The communicator (120) may be connected to an external device 200, which will be explained later, via various communication technologies. For example, a communication channel may be the Internet which can be accessed through a common IP address, or a local area wireless communication which uses radio frequency. In addition, a communication channel may be formed via a small-scale home-wired network. The detailed technical configurations are not part of the technical characteristics of the exemplary embodiments, and thus, they will be omitted.

When the resource for operating a browser in the terminal apparatus 100 is insufficient or does not exist, the controller 130 requests the external device 200 for the computation, receives data according to the computation result, and controls the display to display the data on the browser using the received data.

The controller 130 may render an image on the browser using the received data.

The controller 130 may determine whether the resource is insufficient or does not exist by determining whether a computation can be conducted within a predetermined period of time, based on at least one of a memory in the terminal apparatus 200, an operating process and a processing rate.

When the resource is insufficient or does not exist, the controller 130 may select an external device 200 to conduct the computation and may form a channel.

The controller 130 may select an external device to conduct the computation by considering the network state connecting the terminal apparatus 100 with the external apparatus 200.

The computation may be a Web worker threaded process.

The operation of the terminal apparatus 100 was explained in the exemplary embodiment regarding a method of operating a browser of a terminal apparatus, and thus additional explanations thereof will be explained.

Figure 7:
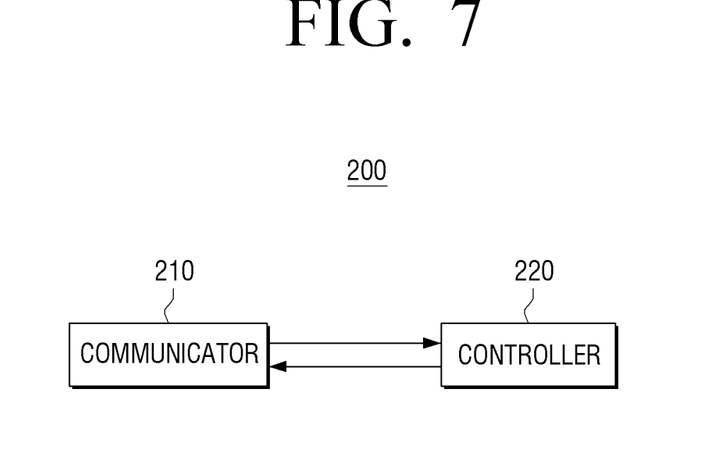
FIG. 7 is a block diagram of an external device, according to an exemplary embodiment.

FIG. 7 is a block diagram of an external device 200 according to an exemplary embodiment.

Referring to FIG. 7, the external device 200 according to an exemplary embodiment comprises a communicator 210, which communicates with a terminal apparatus, and a controller 220, which receives a request for computation for operating a browser from the terminal apparatus 100 when a resource in a terminal apparatus 100 is insufficient or does not exist, conducts the computation according to the received request for computation and controls the transmission of data related to a result of the conducted computation, to the external device. The external device 200 may be the aforementioned second apparatus.

The communicator 210 is a constitutional element which communicates with a terminal apparatus 100. The communicator 210 may be connected to the terminal apparatus 100 via various communication technologies. For example, a communication channel may be the Internet which can be accessed through a common IP address, or may be a local area wireless communication which uses radio frequency. In addition, a communication channel may be formed via a small-scale home wired network. The detailed technical configurations of the communication channel are not technical characteristics of the exemplary embodiments, and thus, they will be omitted.

The controller 220 receives a request for computation for operating a browser from the terminal apparatus 100, conducts the computation according to the received request for computation and controls the transmission of data of a result of the conducted computation to the external device. The operation of the controller 220 is the same as explained in the aforementioned method of operating a browser of the terminal apparatus 100. The controller 220 comprises a CPU for operating the browser of the terminal apparatus in software, and an operating system as well as an application.

The whole operation of the external device 200 is the same as the method of operating a browser of the aforementioned terminal apparatus 100, and thus repeated explanations thereof will be omitted.

Figure 8:
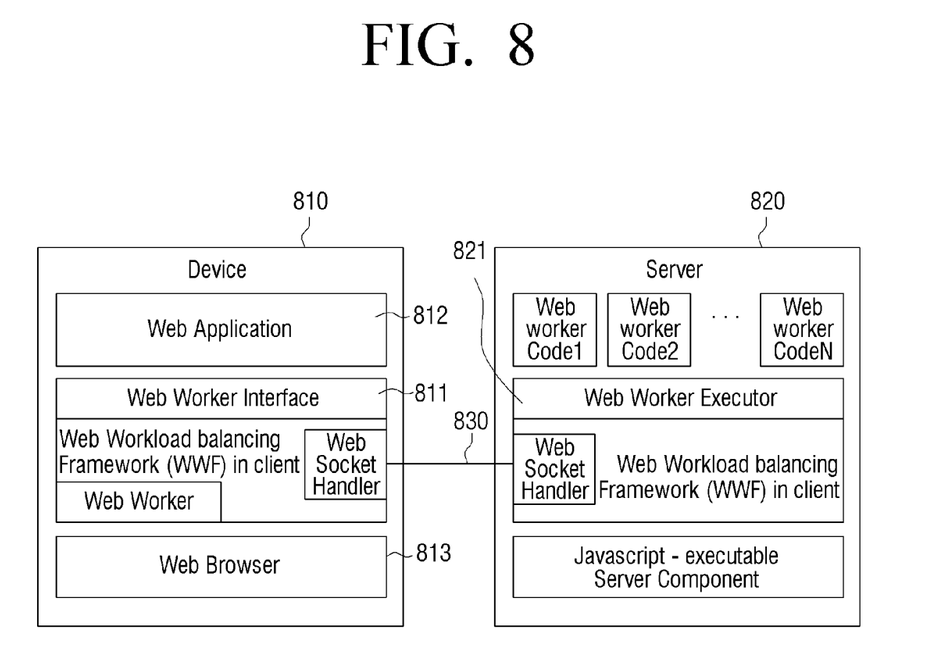
FIG. 8 is a diagram of a Web Workload balancing Framework (WWF), according to an exemplary embodiment.

FIG. 8 is a diagram of a Web Workload balancing Framework (WWF), according to an exemplary embodiment.

In the aforementioned exemplary embodiment, the first apparatus may be a device 810, and the second apparatus may be a server 820. In this case, the device 810 and the server 820 may configure a WWF in FIG. 8.

Figure 9:
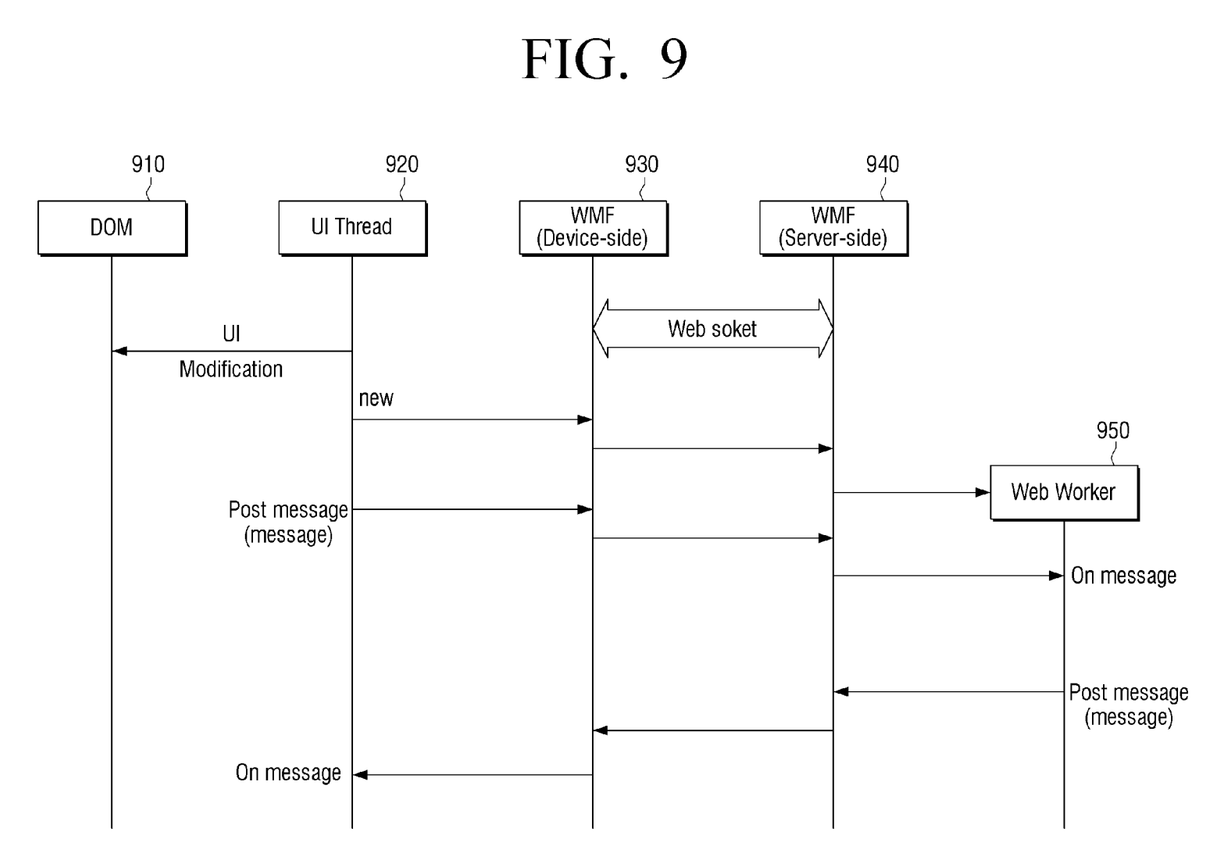
FIG. 9 is a sequence diagram of a WWF.

A WWF of the device 810 is connected to a WWF of the server 820 through a Web Socket Interface 830. In addition, the device 820 exchanges a message with a Web Application 812 by using the Web Worker Interface 830. The WWF of the server 820 executes a web work code in the server 820 through an executable java script, and communicates with the device 810 through the Web Socket Interface 830. FIG. 9 illustrates a sequence flow of a web worker having a WWF.

Unlike the illustration of FIG. 8, the WWF of the device 810 may be located within a web browser 813.

FIG. 9 is a sequence diagram of a WWF.

Referring to FIG. 9, when the Web Application 812 is open, a web socket is open between the WWF of the device 810 and the WWF of the server 820, and all commands of the device 810 and all events of the server are transmitted through the WWF. When there are a plurality of web workers between the device 810 and the server 820, each web worker is identified by an ID in the WWF. In this case, Node.js.™ may be used as a server capable of executing a java scripter. In addition, in order to demonstrate such method easily, the WWF may be used as a java script library.

In addition, the framework may be applied to correction of the Web Application 812 which changes a generation code of a web worker.

As illustrated in FIG. 9, the web worker 930 is completely separated from a UI Tread 920, and the UI Tread directs a DOM tree 910 to change a UI. When a data communication channel is generated, the device transmits data in a WWF web worker by using a method, 'postMessage.' The WWF of the device and the WWF of the server communicate with each other, and the web workers 940 and 950 of the server perform a received operation. Every device receives data through an onmessage event. When the operation is completed, an operation result is transmitted to the device by using the postMessage method.

The aforementioned method of operating a browser of a terminal apparatus according to various exemplary embodiments may be implemented as a program including an algorithm executable in a computer, and the program may be provided by being stored in a non-transitory computer readable storage medium.

A non-transitory computer readable storage medium means a medium which stores data semi-permanently and can be read by a device, not a medium which stores data for a short time. For example, the non-transitory computer readable medium may be one of the readable media such as CDs, DVDs, hard disks, Blue ray Disks®, USBs, memory cards and ROMs.

Although a few embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A method of operating a browser of a terminal apparatus to run a program on the browser, the program comprising a first computation and a second computation, the method comprising:
confirming a resource needed for the first computation for operating the browser in the terminal apparatus,
wherein, when a data amount of the program is larger than a predetermined value, the confirming the resource is conducted in real time while the program is being run on the browser, and
wherein the confirming the resource comprises determining whether the first computation can be conducted within a predetermined period of time based on at least one of a memory in the terminal apparatus, an operating process and a processing rate;
requesting an external device for the first computation and conducting the second computation for operating the browser independently of the first computation when the resource does not exist or is insufficient;
receiving data according to a result of the first computation from the external device; and
displaying data using the received data and a result of the second computation.

2. The method of claim 1, wherein the displaying data comprises rendering an image on the browser using the received data.

3. The method of claim 1, further comprising selecting an external device to conduct the first computation when the resource does not exist or is insufficient and forming a channel.

4. The method of claim 3, wherein the forming a channel comprises selecting the external device to conduct the first computation in view of a network state connecting the terminal apparatus with the external device.

5. The method of claim 1, wherein the external device is a server or another terminal apparatus.

6. The method of claim 1, wherein the first computation is a Web worker threaded process work.

7. A method of operating a browser of a terminal apparatus to run a program on the browser, the program comprising a first computation and a second computation, the method comprising:
confirming, by the terminal apparatus, a resource needed for the first computation for operating the browser;
wherein, when a data amount of the program is larger than a predetermined value, the confirming the resource is conducted in real time while the program is being run on the browser, and
requesting, by the terminal apparatus, an external device for the first computation and conducting the second computation for operating the browser independently of the first computation when the resource does not exist or is insufficient,
wherein the terminal apparatus determines whether the resource is insufficient or does not exist by determining whether the first computation can be conducted within a predetermined period of time based on at least one of a memory in the terminal apparatus, an operating process and a processing rate;
conducting, by the external device, the first computation;
transmitting, by the external device, data according to a result of the first computation to the terminal apparatus; and
displaying, by the terminal apparatus, using the received data and a result of the second computation.

8. A terminal apparatus to run a program on the browser, the program comprising a first computation and a second computation, the terminal apparatus comprising:
a display configured to display a browser;
a communicator configured to communicate with an external device; and
a controller configured, to request the external device perform the first computation, conduct the second computation for operating the browser independently of the first computation and receive data according to a result of the first computation and configured to control to display data on the browser using the received data and a result of the second computation, when a resource needed for the first computation for operating a browser in a terminal apparatus is insufficient or does not exist,
wherein the controller confirms a resource needed for the first computation for operating the browser,
wherein, when a data amount of the program is larger than a predetermined value, the controller confirms the resource in real time while the program is being run on the browser, and
wherein the controller determines whether the resource is insufficient or does not exist by determining whether the first computation can be conducted within a predetermined period of time based on at least one of a memory in the terminal apparatus, an operating process and a processing rate.

9. The terminal apparatus according to claim 8, wherein the controller is configured to render an image using the received data.

10. The terminal apparatus according to claim 8, wherein the controller selects an external device to conduct the first computation and form a channel when the resource is insufficient or does not exist.

11. The terminal apparatus according to claim 10, wherein the controller selects an external device to conduct the first computation in view of a network state connecting the terminal apparatus with the external device.

12. The terminal apparatus according to claim 8, wherein the external device is a server or another terminal apparatus.

13. The terminal apparatus according to claim 8, wherein the first computation is a web worker threaded process.

14. The terminal apparatus according to claim 8, wherein the terminal apparatus is a mobile apparatus.

15. A system of operating a browser of a terminal apparatus to run a program on the browser, the program comprising a first computation and a second computation, the system comprising:
a first apparatus configured, when a resource needed for the first computation for operating a browser in a terminal apparatus is insufficient or does not exist, to request a second apparatus perform the first computation, conduct the second computation for operating the browser independently of the first computation and display data using a result of the first computation received from the second apparatus and a result of the second computation when a resource needed for the first computation for operating a browser in a terminal apparatus is insufficient or does not exist,
wherein the first apparatus confirms a resource needed for the first computation for operating the browser,
wherein, when a data amount of the program is larger than a predetermined value, the first apparatus confirms the resource in real time while the program is being run on the browser, and
wherein the first apparatus determines whether the resource is insufficient or does not exist by determining whether the first computation can be conducted within a predetermined period of time based on at least one of a memory in the first apparatus, an operating process and a processing rate; and
a second apparatus configured to conduct the first computation and transmit to the first apparatus data according to a result of the first computation, in response to there being a request from the first apparatus.

16. A terminal apparatus to run a program on the browser, the program comprising a first computation and a second computation, the terminal apparatus comprising:
a communicator configured to communicate with an external device; and
a controller configured to request the external device perform the first computation, conduct the second computation for operating the browser independently of the first computation and receive data according to a result of the first computation and configured to display data using the received data and a result of the second computation, in response to a resource needed for the first computation for operating a browser in a terminal apparatus being insufficient or does not exist,
wherein the controller confirms a resource needed for the first computation for operating the browser,
wherein, when a data amount of the program is larger than a predetermined value, the controller confirms the resource in real time while the program is being run on the browser, and
wherein the controller determines whether the resource is insufficient or does not exist by determining whether the first computation can be conducted within a predetermined period of time based on at least one of a memory in the terminal apparatus, an operating process and a processing rate.

17. The terminal apparatus of claim 16, further comprising a display.

18. The terminal apparatus of claim 16, wherein the controller is configured to display data on the browser.

19. The terminal of claim 18, wherein the controller is configured to render an image using the received data.

\* \* \* \* \*